Aug. 29, 1939. R. R. CRUM 2,171,057
ROLLER BIT
Filed March 14, 1934 4 Sheets-Sheet 1
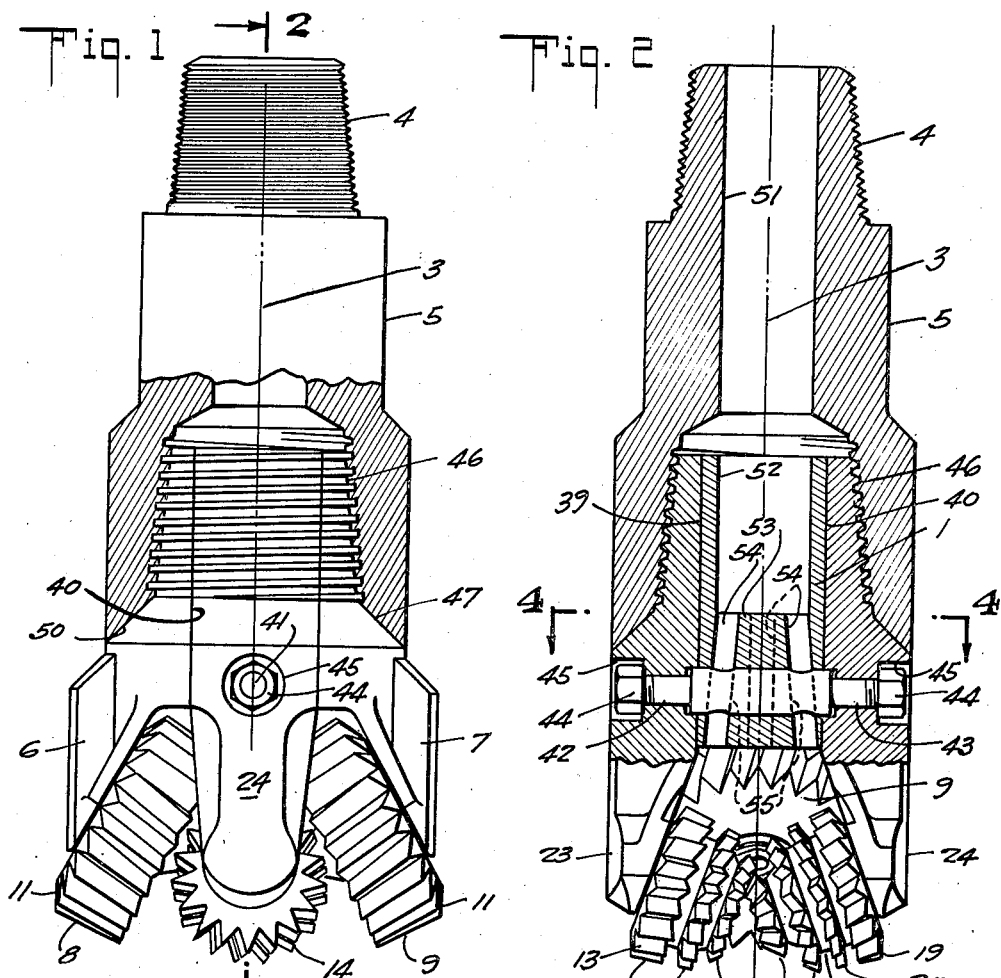
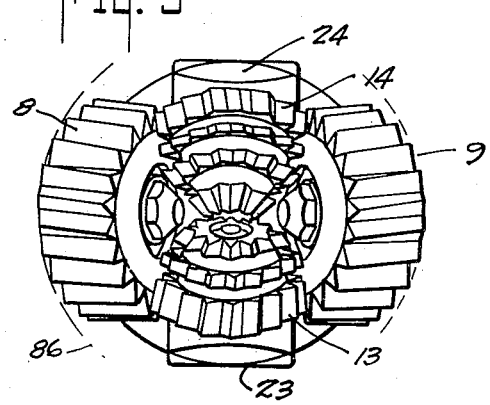
INVENTOR
Roland R. Crum
BY John Flam
ATTORNEY Aug. 29, 1939.    R. R. CRUM    2,171,057
ROLLER BIT
Filed March 14, 1934    4 Sheets-Sheet 3

INVENTOR
Roland R. Crum
BY John F. Law
ATTORNEY

Aug. 29, 1939.                R. R. CRUM                 2,171,057
                              ROLLER BIT
                        Filed March 14, 1934        4 Sheets-Sheet 4
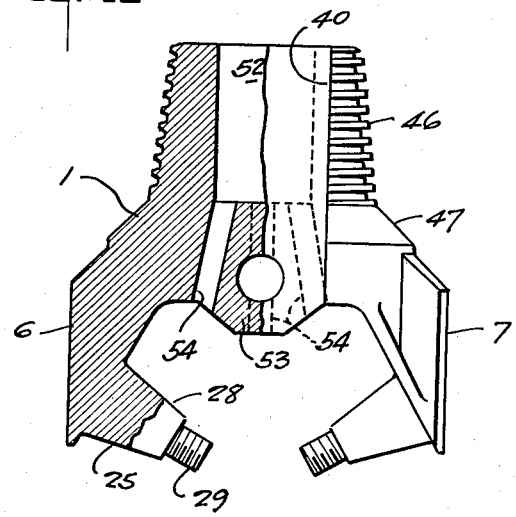
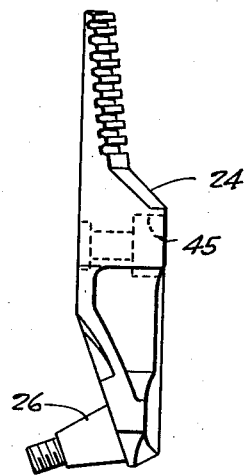
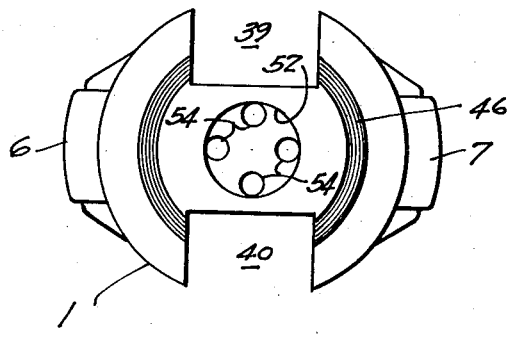
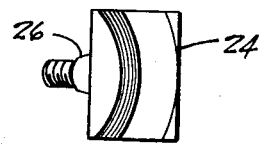
INVENTOR
Roland R. Crum
BY John Flam
     ATTORNEY Patented Aug. 29, 1939

2,171,057

UNITED STATES PATENT OFFICE 2,171,057

ROLLER BIT

Roland R. Crum, Whittier, Calif., assignor of one-fourth to Edwin A. Perkins and three-eighths to Frank W. Brainard, both of Whittier, Calif.

Application March 14, 1934, Serial No. 715,504

13 Claims. (Cl. 255—71)

This invention relates to well drilling tools, and specifically to drill bits of the kind in which are utilized one or more roller cutters. Such roller cutters are commonly provided for rotation with respect to a stationary support, as by the use of shafts or pivots, the axes of which are transverse to the axis of rotation of the bit.

When there are a plurality of sets of cutters, operating respectively at different radii from the axis of rotation, there is sometimes difficulty in replacing or repairing some of the cutters. It is one of the objects of this invention to make it possible to facilitate the assembly of the cutters with respect to the bit body, as well as the removal or repair of the cutters from the bit body.

It is another object of the invention to provide in general a strong and simple construction for a drill bit of this character.

It is still another object of the invention to provide a non-friction bearing structure for the rotary cutters that utilizes balls or rollers, and in which these rolling elements can be effectively assembled in appropriate races.

It is still another object of the invention to provide a bit employing a combination of flat and cone type cutters, so arranged that the cutters operate effectively on different cutting zones.

It is still another object of the invention to make it possible to utilize disc cutters having different axial lengths in connection with a common bit, as by appropriate bearing support constructions.

It is still another object of the invention to provide a roller bit so arranged that the pivot supports for the cutters are supported only at the outer ends, permitting the bit to carry at least some of the cutters to the center of the hole being drilled. In this connection, it is preferable to have all the pivot pins converging downwardly and inwardly.

By ensuring that the pivot pins do not extend across the center, other advantages are secured. Thus the inside or cone cutters can have a sharp taper, so that the small end of the cone is adjacent the center of the hole. By providing a sufficiently sharp taper, the small end of the cone can be caused to slip with respect to the formation being drilled, and the larger portion serves to grip the formation. This slip action is thus provided where there is least area of the formation to be cut per revolution of the bit.

It is another object of the invention to provide such angles of the cutter supports and of the cutter faces that the drilling action is rendered more effective, as by improved grip on the hole bottom. Furthermore, the bit is kept guided thereby in accurate central alinement, and is prevented from being laterally displaced.

It is still another object of the invention to provide a construction for a drill bit utilizing roller cutters, that ensures against undue strains on the bit, and facilitates the maintaining of proper contact of the cutters with the whole surfaces.

This invention possesses many other advantages, and has other objects which may be made more easily apparent from a consideration of several embodiments of the invention. For this purpose there a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Figure 1 is a side elevation of a bit incorporating the invention, the bit body being partly in section;

Fig. 2 is a longitudinal sectional view, taken along plane 2—2 of Fig. 1;

Fig. 3 is a bottom plan view of the bit;

Fig. 13 is a side elevation, partly in section, of the bit frame;

Fig. 14 is a top view thereof;

Fig. 15 is a side elevation of one of the side arms that is detachably fastened to the frame; and Fig. 16 is a top view of said side arm.

Figure 4:
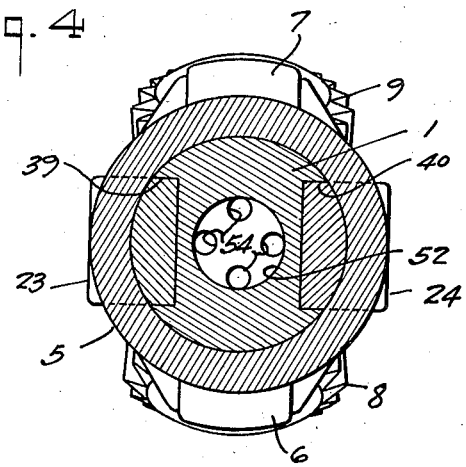
Fig. 4 is a sectional view, taken along plane 4—4 of Fig. 2.

In drilling a deep hole (for example, such as illustrated at 2 in Fig. 5), it has been customary to employ a plurality of roller cutters, the cutters being mounted for free rotation on a bit body or frame, and usually on axes transverse to the axis of rotation of the bit. The roller cutters may have either a conical envelope or a cylindrical envelope, and be provided with teeth which act to cut or abrade the bottom and the side of the hole by virtue of the rotation of the cutters about their supports.

In the present instance a bit construction of this general character is provided. Thus in Figs. 1, 2, 4, 13 and 14, there is illustrated a bit frame 1 adapted to be rotated about its axis 3 as by appropriate power applied adjacent the top of the well. Usually a pipe construction is used to which sections of pipe can be added to form the drill string; and since this is standard practice in oil well drilling, further description of the rotary mechanism is unnecessary. It may be noted, however, that in the present instance the drill string can connect as by the aid of taper threads 4 to the drill bit. These taper threads 4 are formed at the upper end of the bit body 5, which is shown of general cylindrical construction.

The bit frame 1 is arranged to provide pivot supports for a plurality of roller cutters. For example, there may be a pair of opposite arms 6 and 7 formed integrally with the frame 1. Arm 6 is shown in greater detail in Figs. 7 and 13. Each of these arms serves to support an outside cutter 8 and 9 respectively. Both of the axes for the outside cutters 8 and 9 are oblique to the axis 3 of the drill bit. This is shown most clearly in Fig. 7, in which axis 10 is indicated for the cutter 8. It is to be noted that this axis of rotation for the cutter 8 leads inwardly and downwardly with respect to the bit. The arms 6 and 7 are appropriately reenforced or strengthened as by ribs and vanes, for providing a sufficiently rigid construction. It is also to be understood that the entire bit frame 1, as well as the arms 6 and 7, are made from appropriate strong material, such as steel or the like.

The cutters 8 and 9 can be made from a hard metal provided with cutter teeth, that may, if desired, be overlaid with hard facing for providing the proper abrasive action. It is to be noted that the teeth of cutters 8 and 9 are either substantially parallel or spiral with respect to the axis of the cutter. The back portions 11 of the teeth are beveled off to provide a vertical cutting edge in the hole 2. The distance across the bit between the bevels 11 corresponds to the diameter of the hole 2, and it is apparent that these bevels act on the vertical side of the hole as the drill progresses downward.

Figure 6:
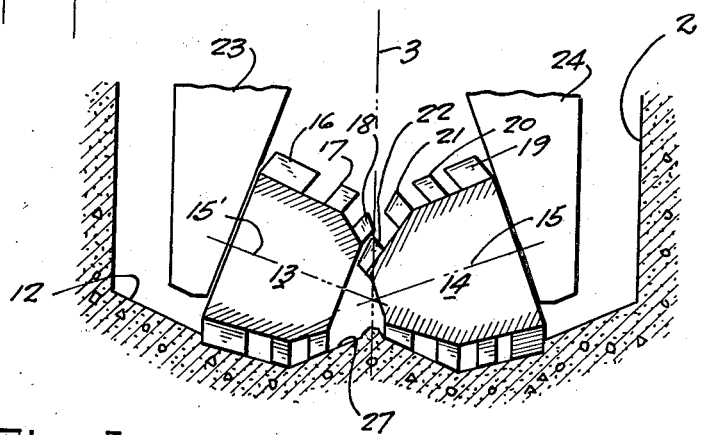
Fig. 6 is a diagram useful in explaining the action of the inside cutters.
Figure 5:
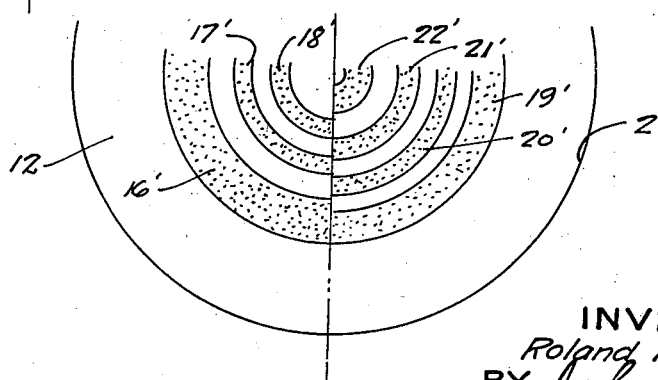
Fig. 5 is a diagram illustrating the action of the inner conical cutters in the bottom of the hole being drilled.

These outside cutters 8 and 9 thus cut the inwardly sloping zone 12 (Figs. 5 and 6).

The bit frame 1 also supports a pair of side arms 23 and 24 carrying oppositely directly conical cutters 13 and 14, intermediate the cutters 8 and 9. These cutters 13 and 14 are supported for free rotation respectively on axes which are oblique to the axis 3 of the bit. The axis for cutter 14 is indicated at 15 in Fig. 8. It is thus seen that all of the axes of all of the cutters converge downwardly and inwardly toward axis 3.

Each of the cutters 13 and 14 is provided with peripheral bands of teeth such as 16, 17 and 18 on cutter 13; and bands 19, 20, 21 and 22 on cutter 14. The outermost bands, such as 16, 17, 19, 20 have a substantially cylindrical, or conical envelope converging inwardly at a small angle. The inner bands such as 18, 21 and 22, also have a conical envelope converging inwardly at a relatively steep angle. As shown most clearly in the diagram of Fig. 5, the zones at the bottom of the hole 2 operated upon by these various bands overlap so that the hole bottom is substantially entirely operated upon. Thus the shaded area 16' represents one quarter of the zone operated upon by the band of teeth 16. The shaded areas 17', 18', 19', 20', 21' and 22' correspond to the zones operated upon by the similarly numbered bands of teeth of the two cutters 13 and 14. It is noted that these zones are arranged in alternation so that there is little if any overlapping between the zones. Yet in combination all of the zones serve to cover substantially the entire surface of the hole bottom inside of the zone 12.

The cutters 13 and 14 can be made from the same type of material as cutters 8 and 9; and can have their teeth similarly overlaid with appropriate hard materials for abrasive purposes.

In order to support cutters 13 and 14, use is made of the arms 23 and 24 supported by the bit frame 1, in a manner to be hereinafter detailed.

The proportioning and arrangement of the four cutters and their axes are of considerable importance in carrying out the objects of the present invention.

Figure 7:
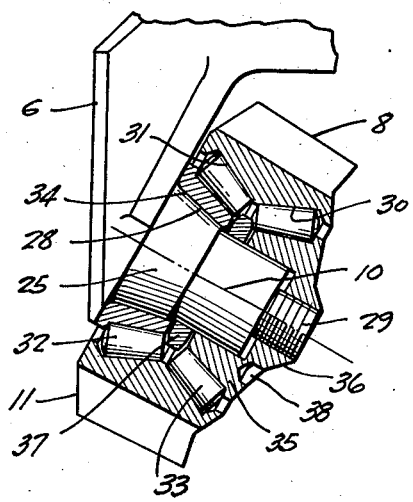
Fig. 7 is an enlarged sectional view of one of the outer cutters and its support.
Figure 8:
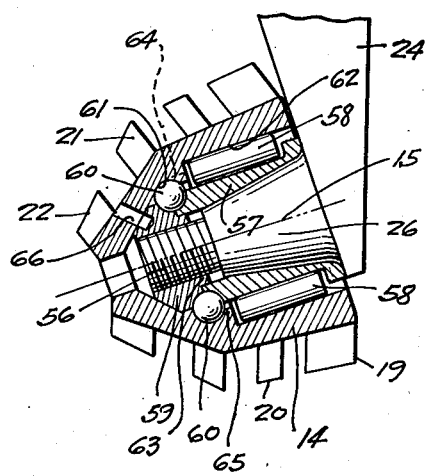
Fig. 8 is an enlarged sectional view of one of the inside cutters and its support.

In the first place all of the four cutters 8, 9, 13 and 14 are supported on stationary pivot shafts which are rigidly attached at their outer ends only to the respective supporting arms. Thus as shown in Figure 7, the cutter 8 is shown as supported on a pivot shaft 25 integral with the supporting arm 6. Similarly, cutter 14 is shown in Fig. 8 as supported on a pivot shaft 26 integral with the supporting arm 24. The pivot shafts for cutters 9 and 13 are similar respectively to pivot shafts 25 and 26. All of these pivot shafts being supported only at their outer ends, a free space is provided at the central portion of the cutter. By virtue of this arrangement, it is possible, as shown most clearly in Fig. 8, to provide a steep taper for the conical bands of teeth 18, 21, 22, on the inside cutters 13 and 14. This is possible because the pivot shafts, such as 26, do not extend through the cutter but only partly therein.

The conical envelope as well as the pitch cone for the band of teeth 18 on cutter 13 converges at a point neighboring the axis 3 of the bit. The same is true of the conical envelope and the pitch cone of the cutter teeth 21 and 22 on cutter 14. This taper is purposely made steep to bring the point of convergence close to the center in order to ensure that these inside cutters grip the bottom of the hole at or adjacent the bands 16, 17, 19 and 20; and there is a consequent slipping between the teeth forming bands 18, 21 and 22 and the bottom of the hole. With a taper on the inner part of the cutters that is not so steep, the cutters would have a tendency to grip on the inside conical teeth rather than on the outer teeth on the substantially cylindrical portion of the cutter. The requirements of drilling, however, are such that the gripping action should take place along the outer zones such as 16' of Fig. 5; and this is ensured by the proper choice of the conical taper, as just explained.

The inner teeth 18, 21 and 22 operate to form a raised center portion 27 (Fig. 5) at the center of the hole 2. The outer teeth 16, 17, 19 and 20 serve to operate on a slanting zone portion sloping upwardly from the base of the central raised portion 27. In other words, there is a reverse angle formed in the bottom of the hole between the center portion 27 and the outer zone operated upon by the inside cutters. The apex of this angle forms the deepest part of the contour of the bottom of the hole 2 and corresponds to the juncture of the differently inclined parts of the inside cutters. By this reverse angle arrangement, a better grip is obtained for the inside cutters, with respect to the hole bottom.

It is furthermore apparent from Fig. 6 that the inner cutters form the advancing part of the drill bit. The sloping zone 12 operated on by the outside cutters 8 and 9 is spaced above the upper edge of the annular zones 16' and 19'. The inner cutters thus cut a path for themselves in the bottom of the hole 2 in advance of the outer cutters 8 and 9. The inside cutters thus provide a pilot for the outside cutters. It is thus seen that the particular shape or contour of the hole bottom assists in eliminating lateral displacement and in keeping the center of the bit accurately alined and guided.

An important advantage is obtainable by using inside cutters having steeply tapered inner cutting surfaces together with oblique axes. Thus one of the cutters, as 14 (Fig. 6) may have its lower or cutting edge brought in close to the axis of the bit. The other cutter 13 is made somewhat shorter. A proper choice of the various angles involved permits the upper part of the cutting edge 22 of cutter 14 to nest closely in under the upper part of the cutting edge 18 on cutter 13 and be overhung thereby, so that the latter cutting edge at its lower part can be fairly close to the axis 3. It is of great value to have a cutting edge close to the axis, as the amount of the bottom formation which is left uncut is thus reduced. At the same time this arrangement retains all the advantages before mentioned of conical cutters and oblique axes.

It is also advisable that the maximum diameter of the outer cutters 8 and 9 be quite large and preferably greater than one-half of the overall diameter of the hole being drilled. Furthermore, the axes of these cutters 8 and 9 slope inwardly toward the axis 3 of the bit. This ensures that a considerable portion of each of the outside cutters 8 and 9 is in drilling contact with the side and bottom of the hole 2. This feature also materially assists in keeping the bit in accurate alinement and in preventing lateral displacement.

By proper proportioning of the slope of the axes of cutters 8 and 9 with the horizontal, and of the diameters thereof the contact between these cutters and the side wall can be maintained quite large, even if the cutter diameter is reduced. Also, the side wall of the hole is operated upon by active tooth portions, rather than by merely the back surface of the teeth. This action is shown in Fig. 3, the line 86 indicating the side wall, and showing how the rear portion of the teeth engage this wall at favorable cutting angles.

The manner in which the cutters 8, 9, 13 and 14 are supported on their respective pivot pins will now be described.

By referring to Fig. 7, the bearing support for outer cutters 8 and 9 can be detailed. In that figure it is seen that if the pivot shaft 25 has a conical base portion 28 as well as a threaded extension 29. The cutter 8 is provided with inwardly tapering roller races 30 and 31. These form the outer races for the rollers 32 and 33. The inner race for the rollers 32 is formed by the aid of a conical sleeve 34 disposed over the part 28 of the pivot pin 25. The inner race for rollers 33 is formed by the aid of a sleeve 35 telescoping over the end of the pin 25 and formed in this instance integrally with a nut 36 adapted to be threaded over the threaded extension 29. An intermediate spacer ring 37 can be provided between the two sleeves 34 and 35.

The assembly of the cutter and its bearing on the pivot shaft 25 can be readily effected. For example, first the rollers 33 can be placed between the sleeve 35 and the corresponding surface 30 of the cutter 8. Then the spacer 37 can be placed against the inner edge of sleeve 35. The sleeve 34 and rollers 32 can then be similarly assemble with respect to the cutter 28 and then the entire assembly of parts 8, 34, 35, 37 and 33 can be slipped over the pivotal shaft 25 and the nut 36 tightened as by the aid of a spanner wrench engaged in recesses 38.

In this arrangement it is possible to utilize any one of a number of cutters 8 having differing axial lengths. This can be accomplished by simply choosing a spacer 37 of the right thickness, sleeves 34 and 35 being the same axial length for all of the cutters.

The inside cutters 13 and 14 are preferably supported on arms which are separable from the bit frame 1. Accordingly the arms 23 and 24 are accommodated, as shown most clearly in Figs. 1 and 4, in grooves or slots 39, 40 extending longitudinally of the bit frame 1. In order to hold these arms 23 and 24 securely in place, a through bolt 41 (Figs. 1 and 2) is provided, extending through both of these arms as well as through the center portion of the bit. This bolt has reduced threaded portions 42 and 43, on which are accommodated the threaded nuts 44. These nuts are sunk into counterbores or recesses such as 45 in the external portion of the arms 24 and 25.

The upper end of the frame 1 is provided with taper threads 46 leading to an outwardly sloping shoulder 47. The grooves 39 and 40 interrupt these threads, but the corresponding external surfaces of arms 24 and 25 complete the threads. In this way, the bit body 5 can be threaded over the arms 23 and 24 as well as over the outer periphery of frame 1. The lower edge of the body 5 is tapered as shown at 50 to coact with the corresponding tapered shoulder formed on the bit frame 1, as well as on the arms 23 and 24. By tightening the body 5 over the threads 46, the bit body 1 serves as an additional means for securely holding the arms to the bit frame.

Ordinarily provisions are made for circulating mud fluid through the drill stem and the drill bit into the hole 2. The bits accordingly usually carry water or fluid courses. In the present instance the bit body 5 has a longitudinal aperture or passageway 51 through which the fluid can pass. A corresponding passageway 52 is provided in the upper part of the bit frame 1. The lower part 53 (Fig. 2) of the frame is made solid except for the transverse aperture for the bolt 41, as well as the downwardly extending apertures 54. These apertures 54 extend entirely through the portion 53 of the frame 1; and two of these apertures in fact connect with corresponding transverse apertures 55 in the bolt 41.

By providing readily removable arms 24 and 25 for supporting the inside rollers 13 and 14, the assembly or replacement of these cutters is greatly facilitated. Furthermore, by virtue of the clamping effect of the body 5 together with the shoulder 50 the completed assembly is rigid and strong, and without any interference to the circulation of mud fluid during the process of drilling.

One manner in which the inside cutters can be rotatably supported on their respective arms is illustrated in Fig. 8. In this figure, the bearing support for cutter 14 is shown, but it is to be understood that a similar support can be provided for the cutter 13.

It is there seen that the pivotal shaft 26 has a conical contour, as well as a threaded extension 56. There is a sleeve 57 forming the inner race for roller bearings 58. This sleeve 57 has an aperture arranged to fit over the tapered pivot shaft 26 and is held in place as by a nut 59 threaded over the extension 56. Supplementing the roller bearings, are ball bearings 60 located in an annular outer race 61 formed on the inside of the cutter 14, and an inner race formed adjacent the engaging edges of the nut 59 and the sleeve 57. The inner surface of cutter 14 is also formed with an outer race 62 for the roller bearings 58. It is also seen that the nut 59 has an extension 63 fitting snugly inside of the inner end of sleeve 57.

The manner in which the cutter 14 and its bearing can be assembled on pivot shaft 26 will now be described. First of all the nut 59 is placed inside of the inner conical portion of cutter 14. The balls 60 are then dropped into the race formed between the nut 59 and the cutter 14. This is rendered possible by the aid of a slot 64 cut between the outer race 61 and the shoulder 65 on the inside of cutter 14. After these balls 60 are in place, the rollers 58 are placed inside of the cutter 14 to contact the race 62. The sleeve 57 is inserted into the cutter and finally the whole assembly including nut 59, cutter 14, sleeve 57, bearings 58 and 60, is passed over the pivotal shaft 26, and the nut 59 is turned down as by the aid of a spanner wrench engaging several recesses 66 which extend through the cutter 14.

Figure 9:
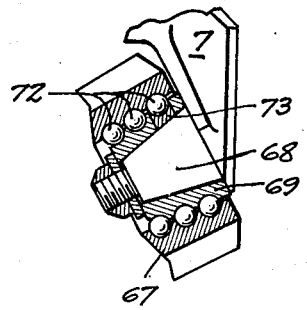
Fig. 9 is a fragmentary sectional view illustrating a modified form of the bearing support for the outer cutters.
Figure 11:
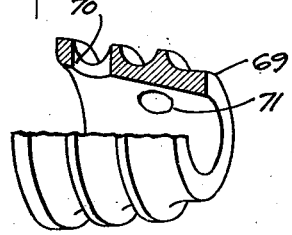
Figs. 11 and 12 are isometric views, partly in section, of the sleeves that may be used in connection with the cutter bearings.

Alternative forms of bearing supports can be provided for the cutters. For example, in Fig. 9, there is shown a modified form of a pivotal support for the outside cutter such as 67. In this case the pivot shaft 68 accommodates a sleeve 69 forming a plurality of inner ball races. This sleeve 69 is shown to best advantage in Fig. 11. In this form of the invention there are apertures such as 70, 71 passing through the sleeve and leading respectively into the bottoms of the inner ball races in the sleeve. Through these apertures the balls 72 can be passed and then the apertures can be plugged as by plugs 73.

The mode of assemblying this type of construction involves the placing of the sleeve 69 inside of the cutter 67; then dropping the balls into the raceways through apertures 70, 71, and then plugging these apertures. After the ball bearings are thus assembled between sleeve 69 and cutter 67, this assembly can be passed over the pivot shaft 68 and held on by the aid of a nut 74.

Figure 10:
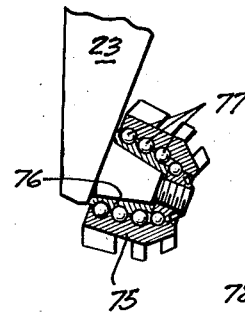
Fig. 10 is a view similar to Fig. 9, of a modified form of the bearing support for the inside cutters.

A similar arrangement is shown in Fig. 10 for the inside cutters. The inside cutter 75 can be pivotally supported on the sleeve 76 as by the aid of a plurality of ball bearings 77.

Figure 12:
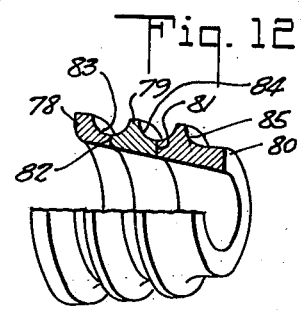

In place of providing apertures such as 70, 71 for permitting insertion of the balls in the races, a slightly modified construction of the sleeve 69 can be provided. This is shown in Fig. 12. In this case the sleeve forming the inner ball races is formed of a plurality of sections 78, 79 and 80. These sections are axially spaced and contact at surfaces 81, 82, which intersect the inner ball races 83, 84. In using this type of sleeve construction, the balls for the innermost ball bearings are first dropped into place inside of the cutter; then the section 80 is placed thereover. The race 85 on this section 80 forms a part of the inner race for this ball bearing. After section 80 is in place, the second set of balls are dropped into that part of the race 81 which is formed by section 80. After these balls are so placed, the intermediate section 79 is inserted. Finally the last set of balls are placed into the arcuate raceway formed at the left side of section 79 and the last section 78 is then inserted over these balls.

I claim:

1. In a roller bit, a bit head frame having a pair of integrally joined roller supporting arms at opposite sides of the frame, and a pair of detachable roller supporting arms, each of said arms being accommodated in a groove in the bit head frame, respectively between the integrally joined arms, said groove having parallel sides a screw thread being formed on the upper part of said frame and said arms, the latter forming portions of a continuous screw thread 2. In a roller bit, a hollow bit head frame, said frame having a pair of roller supporting arms at opposite sides of the frame, a pair of detachable roller supporting arms, said detachable arms being respectively supported on the frame between the other arms, and means passing transversely through the frame for fastening said detachable arms to the frame, said means having one or more passageways therethrough for the passage of a circulating fluid through the hollow frame.

3. In a roller bit, a bit head frame, a pair of detachable roller supporting side arms, and means for fastening said arms detachably to the frame, including a bit body encircling the frame and the arms and having a tapered surface contacting with corresponding tapered surfaces on the frame and the arms, whereby axial movement of the body relative to the frame causes the tapered surface to urge the frame and arms radially inwardly.

4. In a roller bit, a frame, a pair of opposite disc cutters supported by the frame and arranged to operate on an annular area at the outer zone of the hole being drilled, a pair of opposite cone cutters supported by the frame respectively intermediate the disc cutters, and arranged to operate on a circular area inside said annular area, said cone cutters having axes of rotation oblique to the axis of the bit and directed inwardly in the direction of travel of the bit.

5. In a roller bit, a bit frame, a pair of rotatable cutters supported on the frame and each having a conical portion, the axes of rotation of the cutters being oblique to the axis of the bit and being directed downwardly and inwardly, the conical portion having envelopes, the respective elements of which at the portion contacting the bore being at an angle to each other, one of said cutters having annular cutting portions that operate on zones between the zones of operation of the other cutter the cutters being so disposed that only a portion of each has a true rolling motion with regard to the bottom of the bore.

6. In a roller bit, a bit frame, a pair of rotatable cutters, pivot pins supported by the frame for rotatably mounting said cutters, said pins having axes that are oblique to the axis of the bit, and leading downwardly and inwardly to intersect near the axis of the bit, each of said cutters having an outer portion and an inner portion, the inner portion having a conical envelope with an apex falling off the axis of rotation of the bit, the outer portion having an envelope that has a smaller apex angle than the envelope for the inner portion, the inner conical portions being adjacent the center of the bit, and serving to operate on the hole bottom so as to provide a raised center therefor, outer portions serving to operate on an annular surface on the hole bottom which slopes upwardly and outwardly from the base of the raised center of the hole bottom.

7. In a roller bit, a bit frame, a plurality of inside roller cutters, symmetrically disposed with respect to the axis of the bit frame and rotatably supported by the frame, and a plurality of outside roller cutters also rotatably supported by the frame, said outside cutters having axes converging downwardly, and the largest diameter of the outside cutters being greater than half the overall diameter of the hole being drilled, the axes of said outside cutters being at such a slope that, in relation to their diameters, there is a considerable area of contact between these cutters and the sides of the hole being drilled.

8. In a roller bit, a bit frame, inner roller cutters rotatably supported by said frame and adapted to operate on an inner zone of the bore, and outer roller cutters also rotatably supported by said frame and adapted to operate on an outer zone of the bore immediately adjacent the inner zone, those edges respectively of the inner roller cutters and the outer roller cutters which are adjacent the division between said zones, having lowermost points that are spaced vertically from each other.

9. In a roller bit, a bit frame, inner roller cutters rotatably supported by said frame and adapted to operate on an inner zone of the bore, and outer roller cutters also rotatably supported by said frame and adapted to operate on an outer zone of the bore immediately adjacent the inner zone, those edges of the outer roller cutters which are adjacent the division between said zones having lowermost points that are spaced vertically above the lowermost points of those edges of the inner roller cutters which are adjacent said division.

10. In a roller bit, a bit frame, inner roller cutters rotatably supported by said frame and adapted to operate on an inner zone of the bore, and outer roller cutters also rotatably supported by said frame and adapted to operate on an outer zone of the bore immediately adjacent the inner zone, those edges respectively of the inner roller cutters and the outer roller cutters which are adjacent the division between said zones, having lowermost points that are spaced vertically from each other, that portion of the outer cutters operating on said outer zone sloping upwardly and outwardly.

11. In a roller bit, a bit frame, inner roller cutters rotatably supported by said frame and adapted to operate on an inner zone of the bore, and outer roller cutters also rotatably supported by said frame and adapted to operate on an outer zone of the bore, those edges respectively of the inner roller cutters and the outer roller cutters which are adjacent the division between said zones, having lowermost points that are spaced vertically from each other, that portion of the inner cutters operating on the inner portion of said inner zone sloping upwardly towards the axis, that portion of the inner cutters operating on the outer portion of said inner zone sloping upwardly and outwardly.

12. In a roller bit, a bit frame, and a roller cutter rotatably supported by the frame on an oblique axis intersecting the axis of rotation of the bit to operate upon a zone of the bore, said cutter having two bands of teeth, the envelopes of the bands being concentric and intersecting along an intermediate portion of the cutter, the oblique axis of rotation being such that said intermediate portion of the cutter operates at the lowermost part of the zone.

13. In a roller bit, a bit frame, and a roller cutter rotatably supported by the frame, said cutter having an oblique axis intersecting the axis of rotation of the bit to operate upon a zone of the bore, said cutter having an outer and an inner band of teeth, the envelope of one band of teeth converging toward the axis of rotation at a different angle from that at which the envelope of the other band of teeth converges toward said axis, the envelopes of the two bands being concentric and intersecting along an intermediate portion of the cutter, the oblique axis being such that the inner portion of the zone slopes upwardly to the axis and the outer portion of the zone slopes upwardly and outwardly.

ROLAND R. CRUM.